United States Patent
Mergen et al.

(10) Patent No.: US 8,359,188 B2
(45) Date of Patent: Jan. 22, 2013

(54) NETWORK-BASED SYSTEMS AND METHODS FOR PROVIDING ACCESS TO REMOTE LANGUAGE SERVICES ASSETS

(75) Inventors: John-Francis Mergen, Baltimore, MD (US); Blaine Burnham, Omaha, NE (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 991 days.

(21) Appl. No.: 11/617,454

(22) Filed: Dec. 28, 2006

(65) Prior Publication Data
US 2008/0162110 A1  Jul. 3, 2008

(51) Int. Cl.
*G06F 17/28* (2006.01)
(52) U.S. Cl. ............. 704/2; 704/9; 704/257; 704/270
(58) Field of Classification Search .......... 704/275, 704/277, 257, 270, 1–10, 251, 255, 270.1; 1/1; 709/205; 370/352
See application file for complete search history.

(56) References Cited

U.S. PATENT DOCUMENTS

| | | | |
|---|---|---|---|
| 6,747,970 B1 * | 6/2004 | Lamb et al. | 370/352 |
| 6,961,705 B2 * | 11/2005 | Aoyagi et al. | 704/275 |
| 7,058,626 B1 * | 6/2006 | Pan et al. | 1/1 |
| 7,707,250 B2 * | 4/2010 | Guccione | 709/205 |

* cited by examiner

*Primary Examiner* — Huyen X. Vo

(57) ABSTRACT

Systems and methods for providing access to remote language services assets. Deployed first responders access an electronic communications hub using a portable communication device. The communication hub provides the first responder with an interface through which language services assistance may be requested. A data processing facility communicatively coupled to the communications hub may receive the request and, using one or more data analysis routines, select an appropriate language services asset from a pool of available assets. The electronic communications hub may then connect the responder's communication device to the selected language services asset. The pool of available language services assets may be distributed across a wide area network (WAN).

16 Claims, 5 Drawing Sheets

NETWORK-BASED SYSTEMS AND METHODS FOR PROVIDING ACCESS TO REMOTE LANGUAGE SERVICES ASSETS

BACKGROUND INFORMATION

For soldiers, relief workers, law enforcement officers and other personnel, collectively referred to herein as first responders, the ability to communicate with persons in their immediate surroundings is often of paramount importance. If a first responder is unable to effectively communicate with people in his or her surroundings, this can delay or even prevent required assistance from being given and can even result in an unnecessary loss of life due to miscommunication, lack of situational awareness or understanding of cultural differences and/or nuances.

First responders may be deployed in foreign countries, in military zones, and even domestically in ethnic neighborhoods. As a result, it may be necessary for a translator to accompany first responders in their missions in order to assist them in effective communication and other language services. Alternatively, the responders themselves may be required to be trained in native languages and cultures relevant to their surroundings in order to assist themselves.

Having translators accompany first responders, is less than ideal because of the inherent limitation in capability imposed by the number of available translators—a translator can only be in a single place at one time. In conflict situations, the risk to loss of translators exacerbates these constraints. Also, only be a small number of translators and/or cultural experts fluent in some lesser known languages. Thus, the implementation of effective language and cultural services for first responder and other in field workers remains a challenge.

BRIEF DESCRIPTION OF THE DRAWINGS

In order to facilitate a fuller understanding of the present disclosure, reference is now made to the accompanying drawings, in which like elements are referenced with like numerals. These drawings should not be construed as limiting the present disclosure, but are intended to be exemplary only.

DETAILED DESCRIPTION

The following description is intended to convey a thorough understanding of the embodiments described by providing a number of specific embodiments and details involving systems and methods for requesting and providing remote language services. It should be appreciated, however, that the present disclosure is not limited to these specific embodiments and details, which are exemplary only. It is further understood that one possessing ordinary skill in the art, in light of known systems and methods, would appreciate the use of the inventions for its intended purposes and benefits in any number of alternative embodiments, depending upon specific design and other needs.

As used herein, the term "language services" will be used to refer to any type of language-related service including translation, sign language, cultural context, currency conversion other language-related service.

As used herein, the term "electronic communications hub," will be used to refer to a electronic communications hub, web server, or other module that is accessible by a plurality of first responder communication devices and able to connect these devices to appropriate language services personnel. The electronic communications hub may be accessed by dialing in with a communication device, logging in with a computing device, or accessed through another network-based interface means.

As used herein, the term "first responder" will be used to refer to any police, fire, military, security, aid, relief or other crisis/situation management personnel who are typically the first to respond on the seen of an accident, emergency, conflict, disaster, or other emergency situation.

Figure 1:
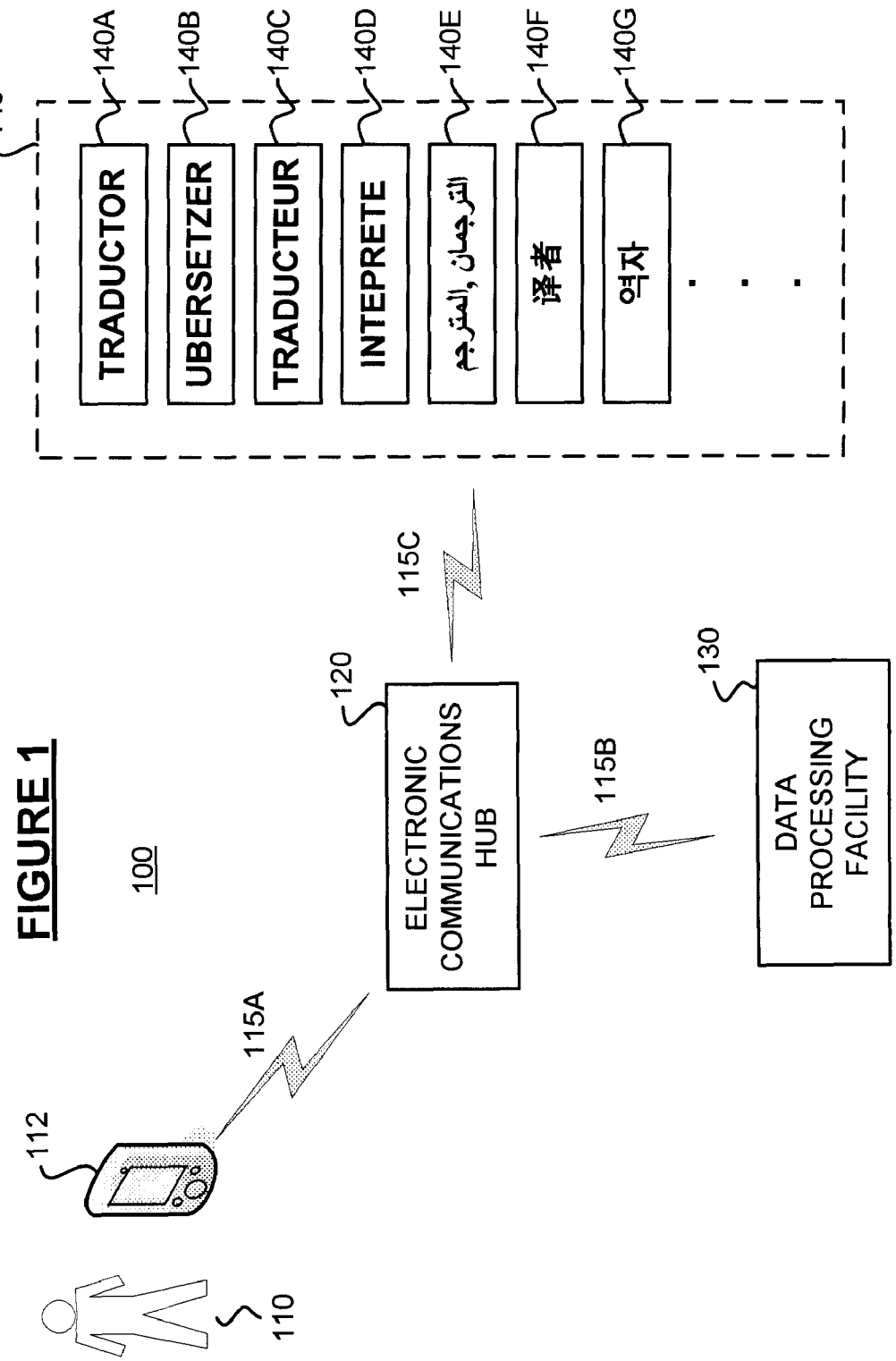
FIG. 1 is a schematic diagram of a network-based system for requesting and providing remote language services in accordance with at least one embodiment of the disclosure.

Referring now to FIG. 1, a schematic diagram of an exemplary network-based system 100 for requesting and providing language services is depicted. The exemplary network-based system 100 may include at least one first responder 110 and a corresponding first responder communication device 112 (also referred to herein as an interface device). In various embodiments, the communication device 112 may comprise a personal communication device such as a cellular phone or two-way radio, a personal digital assistant (PDA), a laptop computer, a palmtop computer, a vehicle-based computer, or other suitable computing and/or communication device having a computer readable storage medium.

The network based system 100 may also include at least one electronic communications hub 120. The electronic communications hub 120 may comprise an automated telephone server, a web server, a communication switch, or other interface and routing device operable to receive requests for remote language services from first responder communication devices 112 and to provide a network connection between an appropriate language services asset 140A-140G, and the requesting responder's interface device 112. As will be discussed in greater detail in the context of FIG. 5, the electronic communications hub 120 may comprise software executing on hardware, dedicated hardware, one or more application specific integrated circuits (ASICs), network communication boards (modems, switches, multiplexers, DSLAMs, etc.), web servers, and combinations of any of these.

The at least one communication device 112 and the electronic communications hub 120 may be communicatively coupled via network connection 115A. Network connection 115A may comprise a wireless connection (e.g., cellular, radio, 802.11x, etc.), a land-based connection (e.g., PSTN, VOIP, etc.), a satellite-based network, or a network comprised of combinations of two or more of these network types.

The system 100 of FIG. 1 may also comprise one or more data processing facilities 130 communicatively coupled to the electronic communications hub 120 via network connection 115B. The one or more data processing facilities 130 may comprise one or more databases, business intelligence systems, business process modeling systems, or other data analysis systems operating on one or more computer systems. In various embodiments, network connection 115B may be one of the aforementioned network connections described in the context of network connection 115A. Network connection 115B may be a direct connection, such as in the case where the electronic communications hub 120 and the data processing facility 130 are in the same location and/or on the same local area network (LAN).

The system 100 of FIG. 1 may also include a pool of available language services assets 140, including individual assets 140A-140G. Each language services asset 140A-140G may comprise a translator, cultural specialist, automated expert system, and combinations of these. For ease of illustration, a single language services asset is shown for each language (Spanish 140A, German 140B, French 140C, Portuguese 140D, Arabic 140E, Chinese 140F, and Korean 140G). However, various embodiments, may employ two or more language service assets for any or all of the various languages represented. Also, various embodiments may include language services assets for additional or even different languages than those illustrated in the exemplary system 100 of FIG. 1.

Each language services asset 140A-140G may be associated with one or more respective computer and/or communication devices (not shown) used to interact with the electronic communications hub 120. For example, these devices may include any combinations of telephones, computers, video conferencing systems, two-way radios, etc. In various embodiments, each language services asset 140A-140G may be located in the same facility, such as an office, campus, base, etc. In addition, each asset 140A-140G may be distributed across a geographic area. Given the pervasiveness of modern communication networks, each asset 140A-140G may be located nearly any place in the world that is accessible by the electronic communications hub 120. That is, the resource pool 140 may comprise a virtual network of widely distributed language assets 140A-140G, each having a unique network address. Each language asset 140A-140G may preferably include video conferencing capability to facilitate real time, two-way communication with the communication device 112 to provide language related services to the first responder 110 and to receive visual context of the first responder's environment.

In various embodiments, when a first responder 110 contacts the electronic communications hub 120 to request language services assistance, the first responder may be prompted to input various fields of information used to characterize the first responder's needs. The communications hub 120 may forward the first responder's request to a data processing facility, such as data processing facility 130 of FIG. 1. The electronic communications hub 120 and data processing facility 130 may by communicatively coupled via network connection 115B. This may be a local area network connection, a direct connection, or a public or private area network connection. That is, the electronic communications hub 120 and data processing facility 130 may be at different physical locations, and even non-stationary locations, thereby creating an adhoc network.

An automated computer program executing on a computer system associated with the data processing facility 130 may analyze the data included in the first responder's request in accordance with one or more data analysis routines. Based at least in part on this data, the one or more data analysis routines may select one or more language services assets to satisfy the first responder's request. In various embodiments, the electronic communications hub 120 may interconnect the first responder's interface device 112 to the selected language services asset 140A-G via communication link 115C. Communication link 115C may comprise a direct landline-based link, a satellite-based link, a wireless 801.11x link or combinations of these types of data links. In various embodiments, communication between a requesting first responder's device 112 and a selected language services asset will pass through the electronic communications hub 120. In various embodiments, the electronic communications hub 120 may hand off the connection so that the language services asset and first responder device 140 can communicate directly. Various embodiments may employ both methods of interconnecting simultaneously depending upon the nature of the communication (e.g., voice, data, video, etc.).

Figure 2:
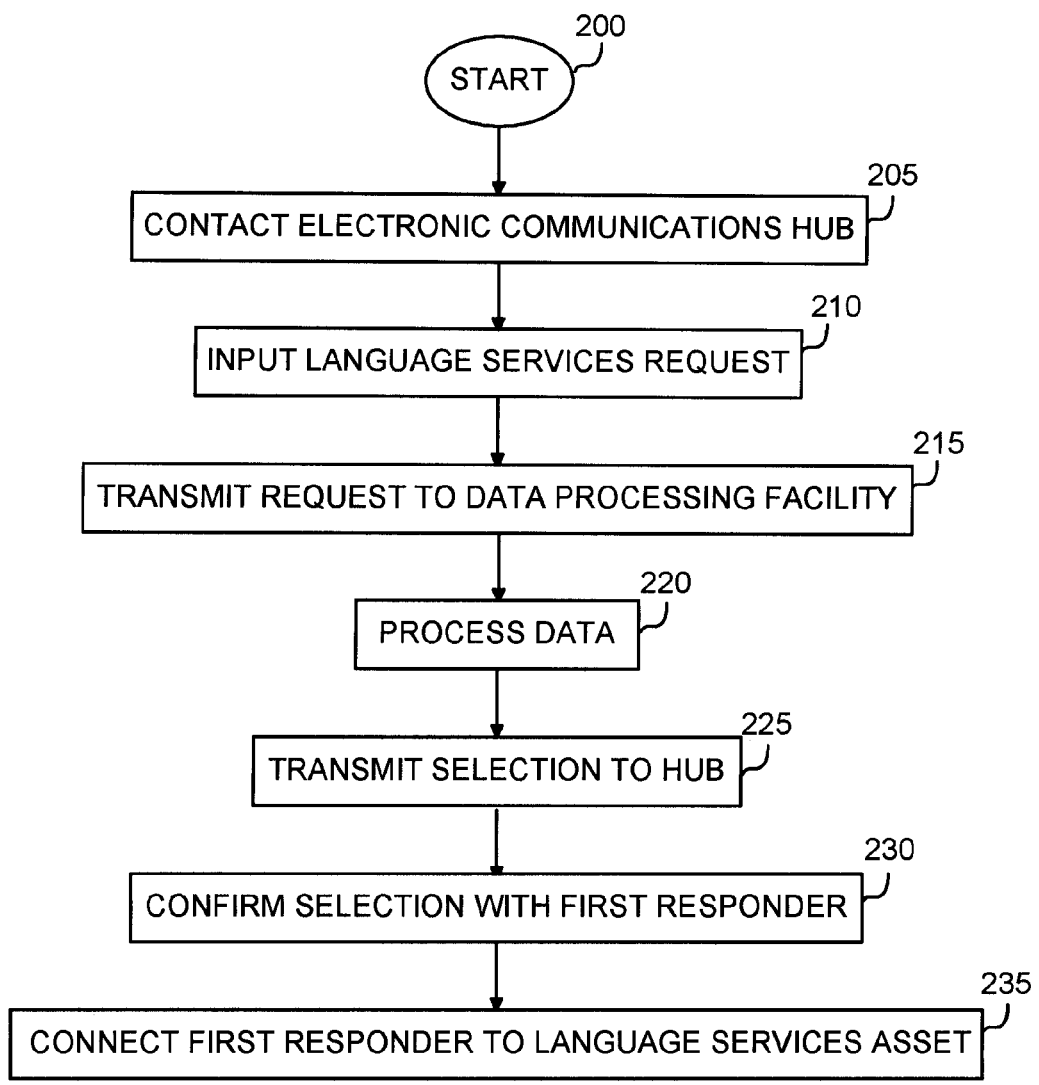
FIG. 2 is a flow chart of an exemplary method for requesting and providing remote language services in accordance with at least one embodiment of the disclosure.

The various embodiments of the disclosure will now be described in the context of exemplary methods. Referring now to FIG. 2, this Figure is a flow chart of an exemplary method for requesting and providing remote language services in accordance with at least one embodiment of the disclosure. The method begins in block 200. In block 205, a first responder 110 contacts the electronic communications hub 120 via the responder's communication device 112. In various embodiments, this may comprise logging on to a network-based website associated with the electronic communications hub 120, dialing into an automated telephone server associated with the electronic communications hub 120, dialing in with a software client executing on the communication device 112, or contacting the electronic communications hub 120 by other means.

In block 210, request data is input by the first responder. In various embodiments this may comprise inputting one or more data fields describing the nature of the required language services. For example, the first responder may input a type of language, a country and/or region name, etc. This input may comprise a voice input, a phone keypad input, a computer keyboard input, or one or more selections made from an interface such as a web browser client executing on a communication device of the first responder, such as device 112 of FIG. 1.

The request information input by the first responder may be uploaded electronically to the electronic communications hub 120 or may be input directly to the hub 120. In block 215, this input information may be transferred by the electronic communications hub 120 to a data processing facility. In block 215, the data corresponding to the request may be forwarded by the electronic communications hub 120 to a data processing facility 130. This may be accomplished by electronically transferring the data using one or more electronic data transfer techniques, such as are well known. In block 220, the data processing facility may process the data corresponding to the first responder's request for language services assistance using one or more automated programs executing on the data processing facility. In various embodiments, the data processing facility may maintain information on a variety of language services assets available—asset pool 140 of FIG. 1. Based on information included in the first responder's request, the data processing facility may select one or more language services assets to satisfy the request.

In various embodiments, the first responder may specify a particular type of language services specialist, for example, Arabic. In other embodiments, the first responder may be unaware of the type of required languages services. In such embodiments, the data processing facility may use information including the first responder's location and/or past requests from the first responder's location or a surrounding/nearby location. Location information may be supplied by the first responder's request or may be determined by the electronic communications hub 120, or the data processing facility 130 using any known location determining technique. The data processing facility may maintain a historical, geo-coded database of the types and specific language services assets used in the past at particular locations.

In block 225, the data processing facility may transmit information identifying the language services asset selected to satisfy the first responder's request. This information may include a network address, number or other contact information for the selected language services asset. In block 230, the electronic communications hub may optionally confirm the selection with the requestor by sending a message, or outputting a response to the first responder's device 112 indicating the selected language services asset and asking the first responder for confirmation to proceed. It should be appreciated that various embodiments, may omit block 230.

In block 235, the electronic communications hub may then establish a connection between the first responder's communication device 112 and the appropriate language services asset 140A-G. In various embodiments, this may comprise establishing a two way audio and/or video link between the first responder's communication device 112 and the selected language services asset via the hub 120. The hub 120 may also route other supplied and/or available information corresponding to the first responder's situation to the language services asset, and may record information transfers between these devices.

Figure 3:
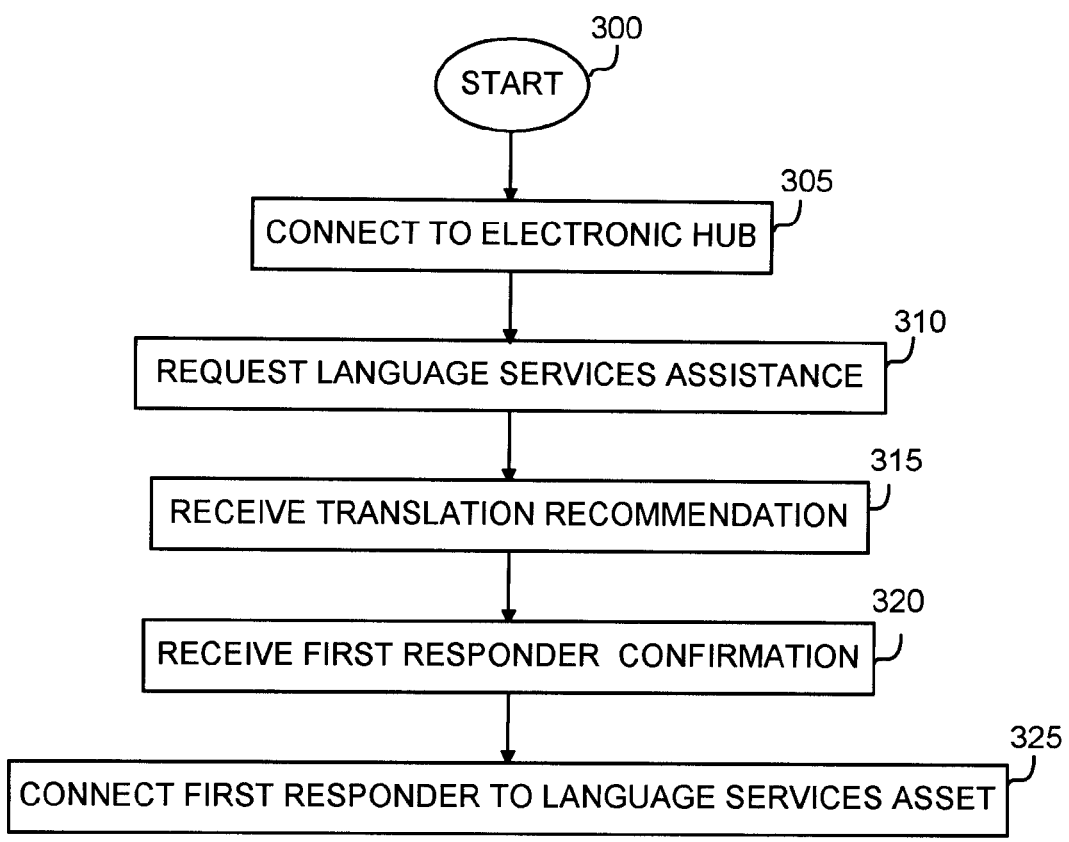
FIG. 3 is a flow chart of an exemplary method for requesting and receiving remote language services from a user interface system component perspective according to at least one embodiment of the disclosure.

FIG. 3 is a flow chart of an exemplary method for requesting and receiving remote language services from a user interface device system component perspective according to at least one embodiment of the disclosure. The method begins in block 300. In block 305, the first responder may connect to the electronic communications hub 120. This may comprise activating a software client executing on the first responder's communication device 112 to connection to the hub. This may also comprise activating a network browser executing on the communication device 112 and navigating to a website associated with the hub. Furthermore, this may comprise placing a call with the device 120 to a phone number associated with the electronic communications hub.

In various embodiments, upon connecting to the hub 120, a menu of choices may be output to the first responder's communication device 112. This may comprise a menu on a screen of an interface program, such as a browser client executing on that device 112. This may also comprise an menu of audio prompts. In block 310, using the interface program, or by speaking or making selections with the communication device 112, the first responder may enter a request for language services assistance to the electronic communications hub As discussed above, the data processing facility may, based on information in the request, select at least one languages services asset to satisfy the first responder's request. In block 315, the first responder may receive an output indicative of the selected language services asset via the responder's interface device 112. In various embodiments, this response may be transmitted via the electronic communications hub 120.

In block 320, a confirmation message may be provided to the first responder's communication device identifying the selected language services asset and requesting confirmation that the selection is acceptable to the first responder. In various embodiments block 320 may be omitted. In block 325, the communication device 112 of the first responder may be communicatively coupled to the selected language services asset. In various embodiments, the responder's device 112 may be connected via a telephone call to the selected language services asset. In various embodiments, the responder's device 112 may be connected via a two-way data and voice connection to the selected language services asset.

Thereafter, the first responder may be able to supply information corresponding to his/her environment to the corresponding language services asset and to receive language services there from.

Figure 4:
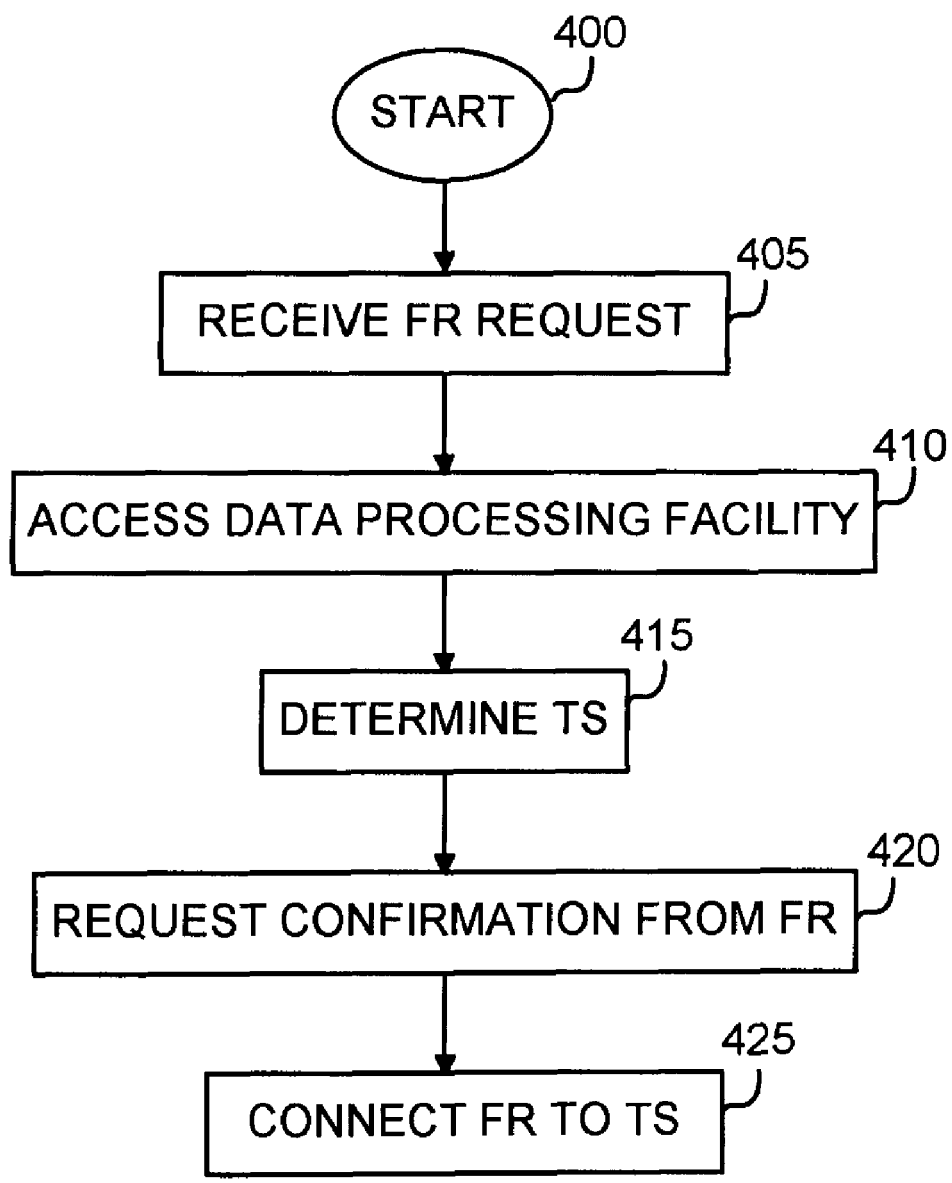
FIG. 4 is a flow chart of an exemplary method for providing remote language services from a data processing facility system component perspective according to at least one embodiment of the disclosure.

FIG. 4 is a flow chart of an exemplary method for providing remote language services from a data processing facility system component perspective according to at least one embodiment of the disclosure. The method begins in block 400. In block 405, a language services request may be received at the data processing facility. In various embodiments, as discussed herein, this may comprise receiving an electronic request from an electronic communications hub 120. In block 410, one or more data analysis routines may be invoked to process the electronic request. As discussed herein, this may comprise selecting one or more language services assets based on data included in the first the request. This data may include the responder's location, the type of services requested, historical data corresponding to the particular responder and/or location, etc. In block 415, based on the results of the data analysis, the data processing facility may select one or more language services assets to satisfy the first responder's request. In block 420, the data processing facility may electronically transmit the one or more selected language services assets to the electronic communications hub 120, via network connection 115B.

Figure 5:
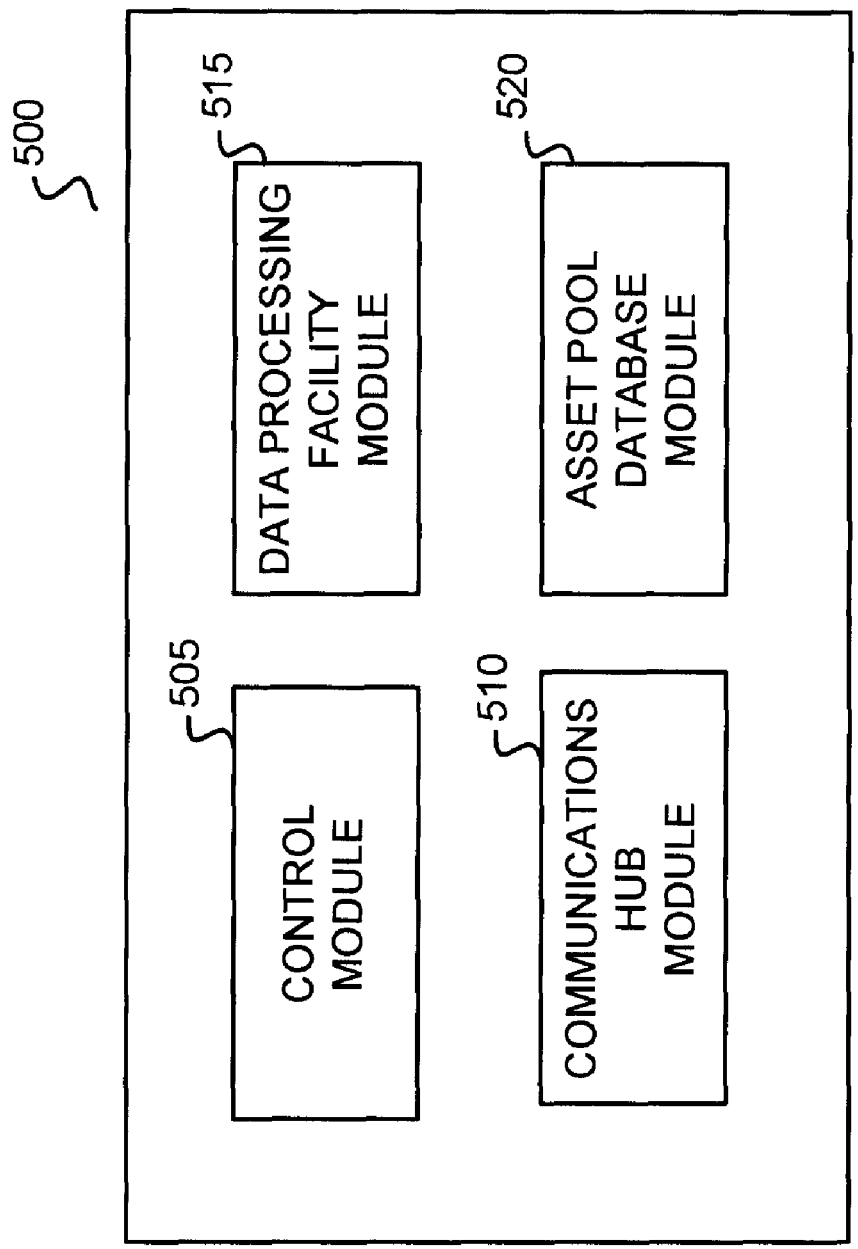
FIG. 5 is a block diagram illustrating exemplary components of a data processing facility component of a system for providing language services assets to remote first responders according to at least one embodiment of the disclosure.

Referring now to FIG. 5, FIG. 5 is a block diagram illustrating exemplary components of a data processing facility 130 component of a system for providing language services assets to remote first responders according to at least one embodiment of the disclosure. In the example of FIG. 5, the data processing facility 130 comprises a plurality of modules including a control module 131, a communications hub module 132, a data processing module 133, and an language services asset pool database module 134. It should be appreciated that although in various embodiments, each module may comprise components of a software-based program. Each module may also be configured as separate software applications executing on computer hardware, one or more application specific integrated circuits (ASICs), a combination of hardware and software, separate computers or computer components, and/or other suitable configuration(s). Moreover, one or modules may be combined or broken into multiple additional modules. Also, additional and/or different modules than those shown in FIG. 5 may be utilized with various embodiments of the invention.

The control module 131 may comprise one or more central processing units (CPUs), controllers, digital signal processors, embedded microprocessors, application specific integrated circuits, or even a real time kernel of a control and/or operating system of the data processing facility 130. The electronic communication hub module 132 may comprise one or more application program interfaces (APIs) or physical interfaces to network connection 115B, interconnecting the data processing facility 130 to the electronic communications hub 120. The communications hub module 132 may also comprise a network interface card, modem, or other interconnect hardware and software.

The data processing module 133 may comprise one or more data analysis routines, that is computer programs that receive language services requests in the form of one or more data input fields and perform a data processing operation on the one or more data input fields to determine an appropriate language services asset to match the requirements of the request. In various embodiments, this may comprise accessing the asset pool database 134. The asset pool database module 134 may store information corresponding a pool of available language services assets. In various embodiments, for each asset, a data record may be maintained that includes the type of language services capability for that asset (i.e., languages spoken, cultures understood) as well as a network address. The asset pool database module 134 may also store information corresponding to past usage of assets, that is, which first responder's used which assets as well as the specific locations, regions and/or areas, in which specific language services assets were previously utilized. This information may be useful in assisting the data processing module 133 in selecting the appropriate asset, particularly when the requesting first responder is unable to specify the type of services required due to lack of situational awareness.

It should be appreciated that the particular modules illustrated in FIG. 5 are exemplary only and should not be construed as either necessary or exhaustive. In various embodiments, it may be desirable to use more, less or even different modules than those illustrated in FIG. 5.

A key feature of the various embodiments of the disclosure is that language services assets may be remotely accessed by first responder's through the use of an intelligent data processing facility and electronic communications hub. Through the various systems and methods disclosed herein, language services assets may be utilized in a manner that increases efficiency, reduces and ideally eliminates risk and that can provide appropriate language services even when the first responder is unsure of the type of services required. This may be provided in part based on the first responder's location and also based on previous services provided to the particular first responder and/or to other first responder's in the surrounding area.

In the preceding specification, various preferred embodiments have been described with reference to the accompanying drawings. It will, however, be evident that various modifications and changes may be made thereto, and additional embodiments may be implemented, without departing from the broader scope of the disclosure as set forth in the claims that follow. The specification and drawings are accordingly to be regarded in an illustrative rather than a restrictive sense.

The invention claimed is:

1. A method comprising:
receiving, using a computing apparatus, an electronic request for language services at an electronic communications hub from a remote requestor communication device that is associated with a first responder, wherein the first responder comprises an individual that responds first to an emergency situation, wherein receiving an electronic request for language services comprises receiving at least one information field selected from the group comprising a first responder identification, a first responder location, and combinations thereof;
determining, using a computing apparatus, at least one language services asset to satisfy the request by querying an electronic asset pool database that is configured to store, for each language services asset, a data record that indicates at least one of a language spoken, a culture understood, and a network address, the electronic asset pool database further configured to store historical information corresponding to a previous request by the first responder for at least one language services asset and a location from where the asset was previously requested;
establishing, using a computing apparatus, a connection to the at least one language services asset from the remote requestor communication device; and
providing at least one of two-way audio communication and two-way video communication between the at least one language services asset and the requestor communication device after the connection is established.

2. The method according to claim 1, wherein providing two-way communication comprises providing two-way audio and video communication between the at least one asset and the requestor communication device.

3. The method according to claim 1, wherein determining at least one language services asset to satisfy the request comprises forwarding the request from the electronic communications hub to a data processing facility.

4. The method according to claim 3, wherein determining at least one language services asset to satisfy the request further comprises making a determination based at least in part on the historical information.

5. The method according to claim 1, wherein determining at least one language services asset to satisfy the request comprises selecting at least one language services asset from a pool of available language services assets.

6. The method according to claim 1, wherein determining at least one language services asset to satisfy the request comprises confirming the at least one language services asset with the requestor via the requestor's communication device.

7. The method according to claim 1, wherein establishing a connection to the at least one language services asset from the requesting device comprises electronically transmitting information corresponding to the requestor device to the at least one language services asset.

8. A system comprising:
at least one electronic communications hub configured to receive language services requests from at least one requestor communication device that is associated with a first responder, wherein the first responder comprises an individual that responds first to an emergency situation, wherein the language services request comprises at least one information field selected from the group comprising a first responder identification, a first responder location, and combinations thereof; and
at least one data processing facility communicatively coupled to the at least one electronic communications hub that receives information corresponding to the language services request and that supplies at least one language services asset recommendation to the electronic information hub by querying an electronic asset pool database that is configured to store, for each language services asset, a data record that indicates at least one of a language spoken, a culture understood, and a network address, the electronic asset pool database further configured to store historical information corresponding to a previous request by the first responder for at least one language services asset and a location from where the asset was previously requested, wherein the at least one electronic communications hub connects the requestor communication device to the recommended language services asset and provides at least one of a two-way audio connection and two-way video connection between the language services asset and the requestor communication device via the electronic communications hub.

9. The system according to claim 8, wherein the at least one electronic communications hub supplies information corresponding to the request to the recommended language services asset.

10. The system according to claim 8, wherein connecting the requestor communication device to a recommended language services asset comprises providing a two-way audio and video connection between the language services asset and the requestor communication device via the electronic communications hub.

11. A method comprising:

sending an electronic communication from a user communication device that is associated with a first responder to an electronic communication hub via a communication network, wherein the first responder comprises an individual that responds first to an emergency situation;

outputting an interface to the user device in response to the electronic communication;

receiving a request for language services via the interface, wherein receiving a request for language services comprises receiving at least one information field selected from the group comprising a first responder identification, a first responder location, and combinations thereof;

forwarding the request to a data processing facility;

selecting at least one language services asset with the data processing facility by querying an electronic asset pool database that is configured to store, for each language services asset, a data record that indicates at least one of a language spoken, a culture understood, and a network address, the electronic asset pool database further configured to store historical information corresponding to a previous request by the first responder for at least one language services asset and a location from where the asset was previously requested;

forwarding the at least one language services asset to the electronic communications hub; and establishing at least one of a two-way audio communication link and a two-way video communication link between the user device and a language services asset via the user interface.

12. The method according to claim 11, further comprising presenting at least one recommended language services asset to the user via the interface prior to establishing the two-way communication link.

13. The method according to claim 12, further comprising establishing the two-way communication link only after receiving a confirmation via the interface that the at least one recommended language services asset is acceptable.

14. The method according to claim 11, wherein establishing a two-way communication link between the user device and a language services asset via the interface, comprises establishing a two-way link with a languages services asset chosen from a pool of available language services assets at least on part based on the historical information.

15. The method according to claim 11, wherein the interface comprises computer readable program code stored in a non-transitory computer readable storage medium adapted to cause a computing device to present an interactive menu of choices to a user.

16. The method according to claim 11, wherein the interface comprises computer readable program code stored in a non-transitory computer readable storage medium adapted to cause a computing device to receive one or more inputs supplied by a user and to transmit the one or more inputs to the electronic communication hub.

* * * * *